April 3, 1945.   J. S. KISH   2,372,834
COMBINED GOGGLES AND RESPIRATOR
Filed Oct. 29, 1943
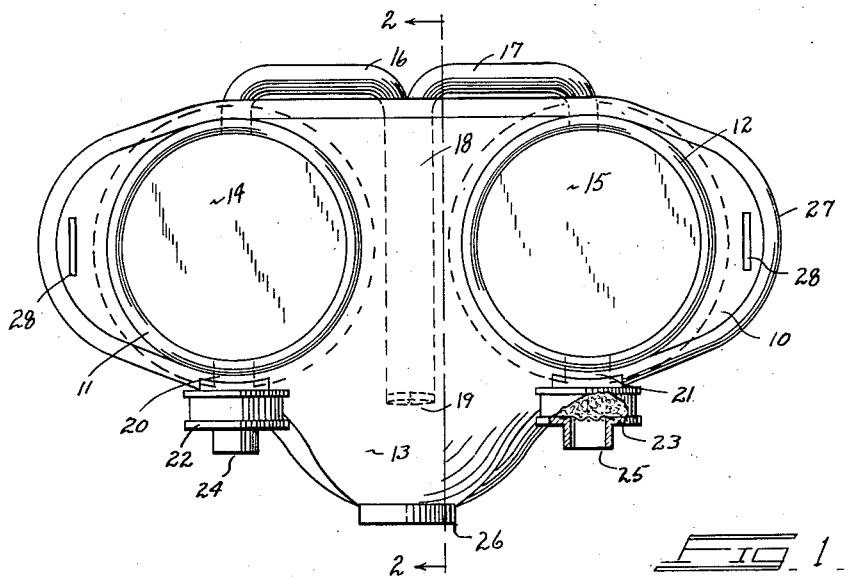
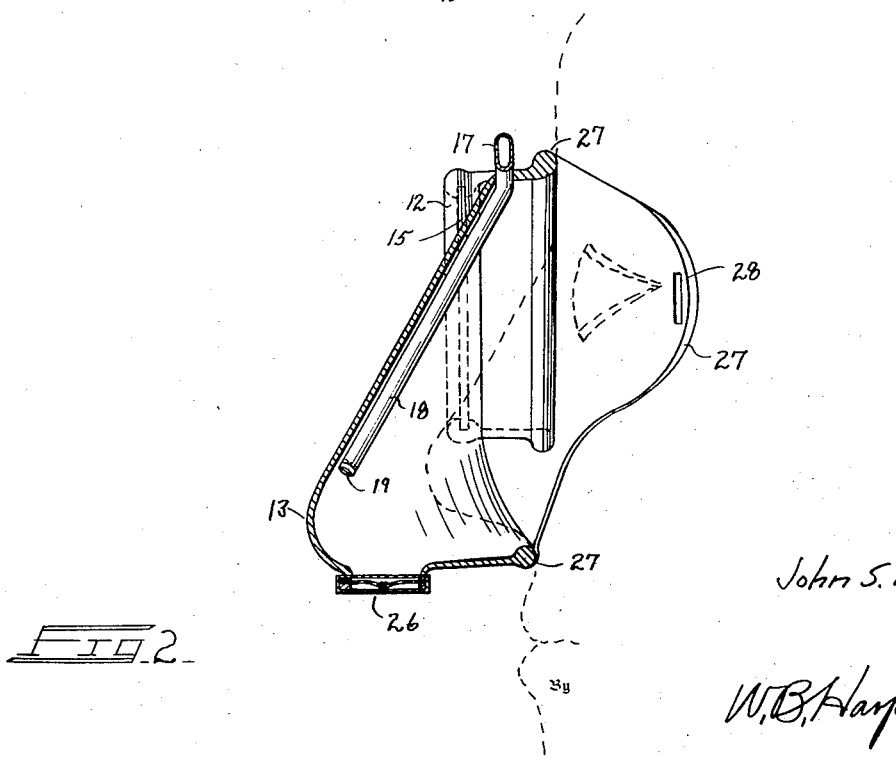
John S. Kish
Inventor
W. B. Harpman
Attorney Patented Apr. 3, 1945

2,372,834

UNITED STATES PATENT OFFICE 2,372,834

COMBINED GOGGLES AND RESPIRATOR

John S. Kish, Youngstown, Ohio

Application October 29, 1943, Serial No. 508,214

2 Claims. (Cl. 128—141)

This invention relates to combined goggles and respirator and more particularly to goggles of the so-called fog proof type.

The principle object of the invention is the provision of a goggle structure adapted for the protection of the eyes of the wearer, which structure incorporates means for protecting the nose of the wearer as from excessive temperatures, and utilizes the respiratory action of the wearer for circulating air through the goggles to avoid fogging of the lenses thereof.

A further object of the invention is the provision of a combination goggles and face protecting structure incorporating means for filtering air being drawn into the respiratory passages of the wearer.

A still further object of the invention is the provision of a combined goggles and face protecting article in which the lenses of the goggles of the said structure are separated from the remainder of the face structure and provided with means for circulating fresh air therethrough to avoid the possibility of moisture condensation on the interior surfaces thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1 is a front elevation of the combination goggles and respirator.

Figure 2 is a cross sectional elevation taken on lines 2—2 of Figure 1.

By referring to the drawing and Figure 1 in particular, it will be seen that a combined goggles and respirator face protecting structure has been designed, which structure is generally indicated by the numeral 10, the goggles being positioned in appropriate positions therein by means of lens retaining frames 11 and 12, respectively. A section 13 of the structure 10 lying between and below the lens carrying frames 11 and 12 is formed so as to enable it to cover the nose of the wearer. Lenses 14 and 15, respectively, which may be optical lenses if necessary, are positioned in the lens carrying frames 11 and 12 at a suitable distance from the face of the wearer by reason of the face protecting formation of the lens carrying frames 11 and 12 which are so designed as to contact the wearer's face about each eye so as to form an individual enclosure thereover, each of the eye enclosures so formed being separated from the center area 13 of the device but connected therewith by means of suitably sized tubes 16 and 17 which lead therefrom to a common manifold 18 which in turn extends into the area 13 and is provided with a check valve 19 at the lowermost end thereof. The check valve 19 is adapted to permit air to pass from the manifold 18 into the area 13 adjacent the wearer's nose and to prevent air from the area 13, about the wearer's nose, from entering the manifold 18 and hence the tubes 16 and 17 and the areas within the lens carrying frames 11 and 12. In order that air may be drawn through the eye covering areas within the lens carrying frames 11 and 12 by respiratory action of the wearer, openings 20 and 21, respectively, are formed in the bottom of each of the lens carrying frames 11 and 12 and communicate directly with the delivery side of filter structures removably attached thereto, the filter structures being indicated by the numerals 22 and 23, respectively, and the air inlets being indicated by the numerals 24 and 25, respectively.

It will thus be seen that a person wearing the combination goggles and respirator will, when breathing in, exhaust the air from within the area 13 and thereupon draw air through the manifold 18, which in turn is supplied from the tubes 16 and 17, the area within each of the lens carrying frames 11 and 12 and through the filters 22 and 23. Thus fresh filtered air is continuously drawn through the eye enclosures beneath the lenses 14 and 15 by the respiratory action of the wearer, the check valve 19 incorporated in the structure of the manifold 18 providing against the exhalation therethrough. A suitable one-way valve which may be a flap valve, indicated by the numeral 26, is affixed to an opening in the enlarged area 13 of the goggle structure 10 so as to provide passageway for exhaled air. The valve 26 being a one-way valve prevents the air from being drawn into the area 13 adjacent the nose of the wearer through this opening. The structure is provided about its perimeter with a cushion-like resilient padding 27, as are the lens carrying frames 11 and 12, so that the entire structure fits against the wearer's face in a more or less air tight manner which is necessary to insure the satisfactory operation of the device. The sideward extensions of the structure are each provided with slots 28 through which elastic bands may be passed for attachment thereto, which elastic bands are positioned about the back of the wearer's head so as to hold the combination goggles and respirator in operative position over the eyes and nose of the wearer.

It will thus be seen that the formation of the combination goggles and respirator structure is such that individual enclosures are formed over the eyes of the wearer and a separate enclosure formed about the nose of the wearer and that the construction of the invention utilizes the respiratory action of the wearer for continuously drawing filtered air through the eye enclosures, which action completely eliminates the possibility of the condensation of moisture on the lenses thereof. In addition to this advantage, the combination goggles and respirator possesses the desirable advantage of protecting the nose and adjacent facial areas of the wearer from excessive temperatures which are frequently encountered in industrial operations as well as from flying sparks and metal particles which frequently disfigure the wearer.

It will thus be seen that the device of the invention is particularly adapted for use in connection with many industrial operations such as welding, handling molten metals, operating various machines wherein chips and other metallic particles are removed from the workpiece. The device is also useful in many other activities as protection from gases, dust, smoke, fumes, etc.

Having thus described my invention, what I claim is:

1. In a combined goggles and respirator consisting of a mask-like structure adapted to cover the wearer's eyes and nose and provided with eye enclosing frames having lenses positioned therein, each of which frames forms an enclosure about an eye, an opening in each of the said eye frames, removable air filters affixed in the said openings, the said openings providing access to the atmosphere through the said filters, secondary openings in the said eye frames, tubular means communicating with the said secondary openings and with a manifold structure positioned within the nose enclosing portion of the structure, an inhalation valve on said manifold adapted to close against exhalation and an exhalation valve in said nose enclosing portion of the structure communicating with the atmosphere and adapted to close against inhalation.

2. In a combined goggles and respirator consisting of a mask-like structure adapted to cover the wearer's eyes and nose and provided with eye enclosing frames having lenses positioned therein, each of which frames forms an enclosure about an eye, an opening in each of the said eye frames, removable air filters affixed in the said openings, the said openings providing access to the atmosphere through the said filters, secondary openings in the said eye frames, tubular means communicating with the said secondary openings and with a manifold structure positioned within the nose enclosing portion of the structure, an inhalation valve on said manifold adapted to close against exhalation and an exhalation valve in said nose enclosing portion of the structure communicating with the atmosphere and adapted to close against inhalation, together with tubular extensions formed on the said air filter structures to provide means of attachment for air supplying members such as compressed air lines.

JOHN S. KISH.